(12) United States Patent
Dong

(10) Patent No.: US 10,564,945 B2
(45) Date of Patent: Feb. 18, 2020

(54) METHOD AND DEVICE FOR SUPPORTING MULTI-FRAMEWORK SYNTAX

(71) Applicant: BEIJING XIAOMI MOBILE SOFTWARE CO., LTD., Beijing (CN)

(72) Inventor: Hongguang Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/030,332

(22) Filed: Jul. 9, 2018

(65) Prior Publication Data
US 2019/0012153 A1 Jan. 10, 2019

(30) Foreign Application Priority Data

Jul. 7, 2017 (CN) .......................... 2017 1 0551959

(51) Int. Cl.
G06F 9/44 (2018.01)
G06F 8/41 (2018.01)

(52) U.S. Cl.
CPC ................... *G06F 8/427* (2013.01)

(58) Field of Classification Search
CPC .................................... G06F 8/427
USPC ....................................... 717/144
See application file for complete search history.

(56) References Cited

U.S. PATENT DOCUMENTS 6,816,871 B2 * 11/2004 Lee ..................... G06F 21/6218
6,901,403 B1 * 5/2005 Bata ........................ G06F 16/26
6,981,212 B1 * 12/2005 Claussen ............... G06F 16/986
715/205
7,246,305 B2 * 7/2007 Batres ................... G06F 17/243
715/234
7,512,875 B2 * 3/2009 Davis .................. G06F 17/2247
345/440
8,185,816 B2 * 5/2012 Davis .................. G06F 16/9558
715/209
2009/0043797 A1 * 2/2009 Dorie ..................... G06F 16/355

FOREIGN PATENT DOCUMENTS

CN 105630902 A * 6/2016

OTHER PUBLICATIONS

Extended European search report issued in corresponding European Application No. 18182200.8, dated Nov. 7, 2018, 9 pages.
Zarifis, Konstantinos et al. "In-depth Survey of MVVM Web Application Frameworks" Technical report of UCSDSE, University of California, San Diego, Mar. 16, 2016, pp. 1-15, XP055520208. Retrieved from the Internet: URL: http://db.ucsd.edu/wp-content/uploads/2017/03/main.pdf.

(Continued)

*Primary Examiner* — Evral E Bodden
(74) *Attorney, Agent, or Firm* — Arch & Lake LLP

(57) ABSTRACT

The present disclosure relates to a method and a device for supporting multi-framework syntax. The method includes a first abstract syntax tree corresponding to a HTML template and at least one JSX block is generated, a mapping relationship between each node of the first abstract syntax tree and syntax of a designated framework is determined, and the first abstract syntax tree is mapped to an abstract syntax tree of the designated framework according to the mapping relationship.

6 Claims, 2 Drawing Sheets

(56) References Cited

OTHER PUBLICATIONS

Simkhada, Kumar "Transitioning Angular 2 User Interface (UI) into React" Bachelor Thesis of Helsinki Metropolia University of Applied Science, Finland, Apr. 12, 2017, pp. 1-54, XP055520254. Retrieved from the Internet: URL: https://www.theseus.fi/bitstream/handle/10024/124681/thesis_final.pdf?sequence=1.

Reynders, Bob et al. "Experience Report: Functional Reactive Programming and the DOM" Apr. 3, 2017, pp. 1-6, XP058369018, DOI: 10.1145/3079368.3079405.

Sambasivan, Divya et al. "Generic framework for mobile application development" 2011 Second Asian Himalayas International Conference on IEEE, Nov. 2011, pp. 1-5, XP032081239, DOI: 10.1109/AHICI.2011.6113938.

\* cited by examiner

METHOD AND DEVICE FOR SUPPORTING MULTI-FRAMEWORK SYNTAX

CROSS REFERENCE TO RELATED APPLICATION

This application is based upon and claims a priority to Chinese Patent Application No. 201710551959.8, filed on Jul. 7, 2017, the entire content of which is incorporated herein by reference for all purposes.

TECHNICAL FIELD

The present disclosure relates to the field of front-end development, and more particularly, to a method and a device for supporting multi-framework syntax.

BACKGROUND

Nowadays, there are various front-end development frameworks. As a result, front-end developers need to keep learning continuously regarding how to use the development framework. Such learning prolongs a development period and causes a low usage efficiency of the developers.

SUMMARY

According to examples of the present disclosure, it is provided a method, a device and a non-transitory computer readable medium for supporting multi-framework syntax.

According to a first aspect of the present disclosure, a method for supporting multi-framework syntax is provided. The method may include: generating a first abstract syntax tree corresponding to a HTML template and at least one JSX block; determining a mapping relationship between each node of the first abstract syntax tree and syntax of a designated framework; and mapping the first abstract syntax tree to an abstract syntax tree of the designated framework according to the mapping relationship.

According to a second aspect the present disclosure, it is provided a device for supporting multi-framework syntax. The device may include: a processor, and a memory configured to store instructions executable by the processor, and where the processor may be configured to execute the instructions to perform: generating a first abstract syntax tree corresponding to a HTML template and at least one JSX block; determining a mapping relationship between each node of the first abstract syntax tree and syntax of a designated framework; and mapping the first abstract syntax tree to an abstract syntax tree of the designated framework according to the mapping relationship.

According to a third aspect of the present disclosure, a non-transitory computer-readable storage medium for supporting multi-framework syntax is provided. The non-transitory computer-readable storage medium may store instructions, and when they are executed by a processor, may cause the processor to perform generating a first abstract syntax tree corresponding to a HTML template and at least one JSX block, determining a mapping relationship between each node of the first abstract syntax tree and syntax of a designated framework, and mapping the first abstract syntax tree to an abstract syntax tree of the designated framework according to the mapping relationship.

It is to be understood that, both the foregoing general description and the following detailed description are exemplary and explanatory only and are not restrictive of the present disclosure.

BRIEF DESCRIPTION OF THE DRAWINGS

The accompanying drawings herein are incorporated in and become parts of the specification, illustrate examples consistent with the disclosure and, together with the description, serve to explain the principles of the disclosure.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

Descriptions will now be made in detail to examples, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the disclosure. Instead, they are merely examples of devices and methods consistent with aspects related to the disclosure.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if"

may be understood to mean "when" or "upon" or "in response to" depending on the context.

Figure 1:
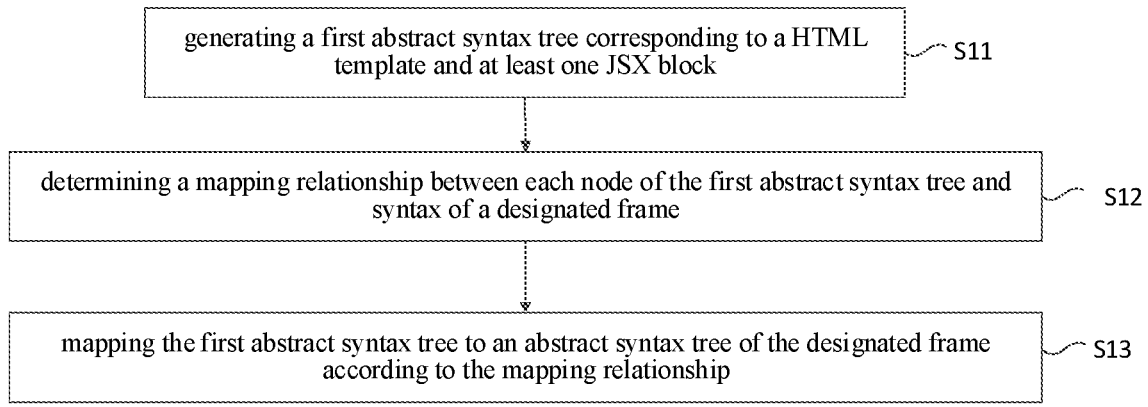
FIG. 1 is a flow chart illustrating a method for supporting multi-framework syntax according to an example.

FIG. 1 is a flow chart illustrating a method for supporting multi-framework syntax according to an example. As illustrated in FIG. 1, the method includes followings.

At act S11, a first abstract syntax tree corresponding to a Hyper Text Markup Language (HTML) template and at least one JavaScript Syntax eXtension (JSX) block is generated.

The JSX block refers to source codes described by using JSX syntax. The JSX syntax may be considered as syntax combining JavaScript with Extensible Markup Language (XML) syntax.

The abstract syntax tree (AST) is a tree that is representable of abstract syntax structures of the source codes. Each node of the abstract syntax tree indicates one of the structures of the source codes.

The AST may be a tree representation of the abstract syntactic structure for the source code written in a computer programming language. Each node of the tree may denote a construct occurring in the source code. Thus, the syntax is "abstract" and may not be representing every detail appearing in the real syntax. For example, grouping parentheses are implicit in the tree structure, and a syntactic construct like an if-condition-then expression may be denoted by means of a single node with three branches.

At act S12, a mapping relationship between each node of the first abstract syntax tree and syntax of a designated framework is determined.

The designated framework may be a Vue framework, a React framework, a Weex framework or the like.

In an example, a mapping library may be set in advance for the designated framework. The mapping library may include the mapping relationship between each structure indicated by each node of the first abstract syntax tree and the syntax of the designated framework. Therefore, the mapping relationship between each node of the first abstract syntax tree and the syntax of the designated framework may be determined by searching for in the mapping library.

For example, for the Vue framework, the mapping relationships set in the mapping library may include: text→p, image→img and the like. A node of the first abstract syntax tree indicated by "text" may be mapped to "p"; and A node of the first abstract syntax tree indicated by "image" may be mapped to "img".

At act S13, the first abstract syntax tree is mapped to an abstract syntax tree of the designated tree according to the mapping relationship.

Each node of the first abstract syntax tree may be mapped according to the above mapping relationship, to obtain a mapped syntax tree. The mapped syntax tree is the abstract syntax tree of the designated framework.

With the examples of the present disclosure, a front-end developer does not need to learn various development frameworks. Instead, the front-end developer may employ the HTML template and the JSX syntax, such that the abstract syntax tree corresponding to the designated framework may be automatically generated, thereby improving development efficiency of the front-end developer and shortening a development period.

The front-end herein may refer to a graphic user interface or various display of the computer applications including but not limited to the user interfaces of personal computer applications, web applications, and/or mobile applications and the like.

Figure 2:
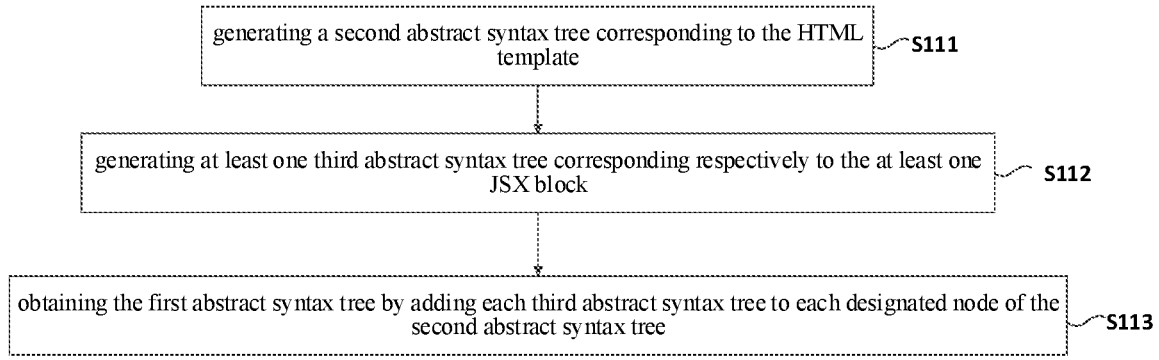
FIG. 2 is a flow chart illustrating a method for generating a first abstract syntax tree according to an example.

FIG. 2 is a flow chart illustrating a method for generating a first abstract syntax tree according to an example. The act S11 illustrated in FIG. 1 may include the method illustrated by FIG. 2. The act of generating the first abstract syntax tree corresponding to the HTML template and the at least one JSX block may include followings illustrated as FIG. 2.

At act S111, a second abstract syntax tree corresponding to the HTML template is generated.

In an example, the HTML template may be parsed to obtain a Document Object Model (DOM) tree corresponding to the HTML template as the second abstract syntax tree. Thus, a node of an abstract syntax may be mapped to an element of the abstract syntax of the HTML.

At act S112, at least one third abstract syntax tree corresponding respectively to at least one JSX block is generated.

Each node of the third abstract syntax tree corresponding to the JSX block may be a variable, a function, a statement or the like.

At act S113, the first abstract syntax tree is acquired by adding each third abstract syntax tree to each designated node of the second abstract syntax tree.

In an example, it may designate a node of the second abstract syntax tree as a father node for each third abstract syntax tree.

Figure 3:
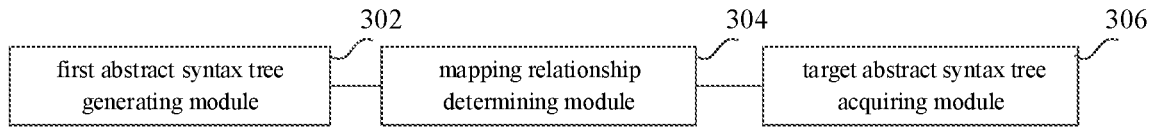
FIG. 3 is a block diagram illustrating a device for supporting multi-framework syntax according to an example.

FIG. 3 is a block diagram illustrating a device for supporting multi-framework syntax according to an example. The device includes a first abstract syntax tree generating module 302, a mapping relationship determining module 304 and a target abstract syntax tree acquiring module 306.

The first abstract syntax tree generating module 302 is configured to generate a first abstract syntax tree corresponding to a HTML template and at least one JSX block. The designated framework includes a Vue framework, a React framework, a Weex framework or the like.

The mapping relationship determining module 304 is configured to determine a mapping relationship between each node of the first abstract syntax tree and syntax of a designated framework.

The target abstract syntax tree acquiring module 306 is configured to map the first abstract syntax tree to an abstract syntax tree of the designated framework according to the mapping relationship.

Figure 4:
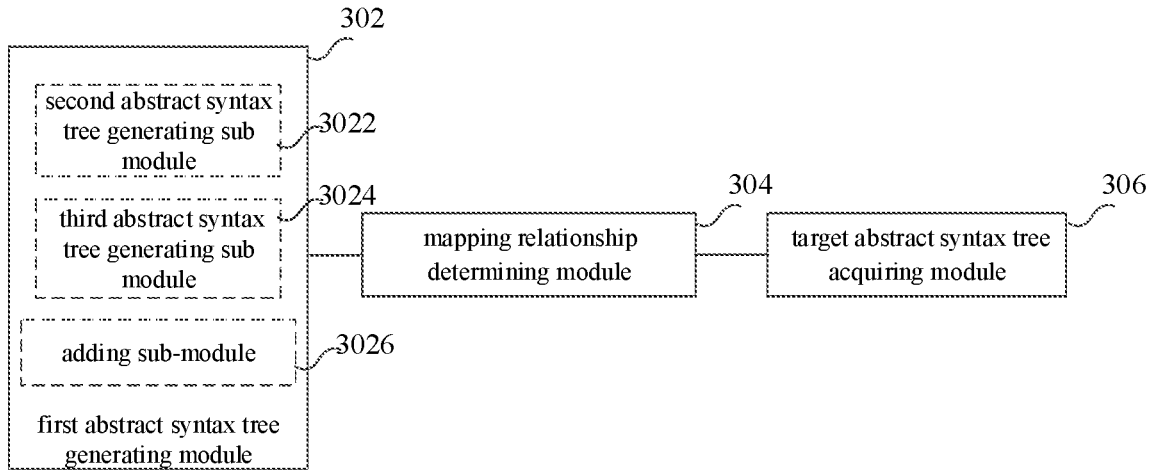
FIG. 4 is a block diagram illustrating a device for supporting multi-framework syntax according to an example.

FIG. 4 is a block diagram illustrating a device for supporting multi-framework syntax according to example. The mapping relationship determining module 304 and the target abstract syntax tree acquiring module 306 illustrated in FIG. 4 are similar to those illustrated in FIG. 3. In an example of FIG. 4, the first abstract syntax tree generating module 302 may include: a second abstract syntax tree generating sub module 3022, a third abstract syntax tree generating sub module 3024 and an adding sub-module 3026. The second abstract syntax tree generating sub module 3022 is configured to generate a second abstract syntax tree corresponding to the HTML template. The third abstract syntax tree generating sub module 3024 is configured to generate at least one third abstract syntax tree corresponding respectively to the at least one JSX blocks. The adding sub-module 3026 is configured to add each third abstract syntax tree to each designated node of the second abstract syntax tree, so as to acquire the first abstract syntax tree.

Regarding to the device provided in above examples, detail implementations of operations of each module may be referred to those described in method examples, which are not elaborated herein.

Figure 5:
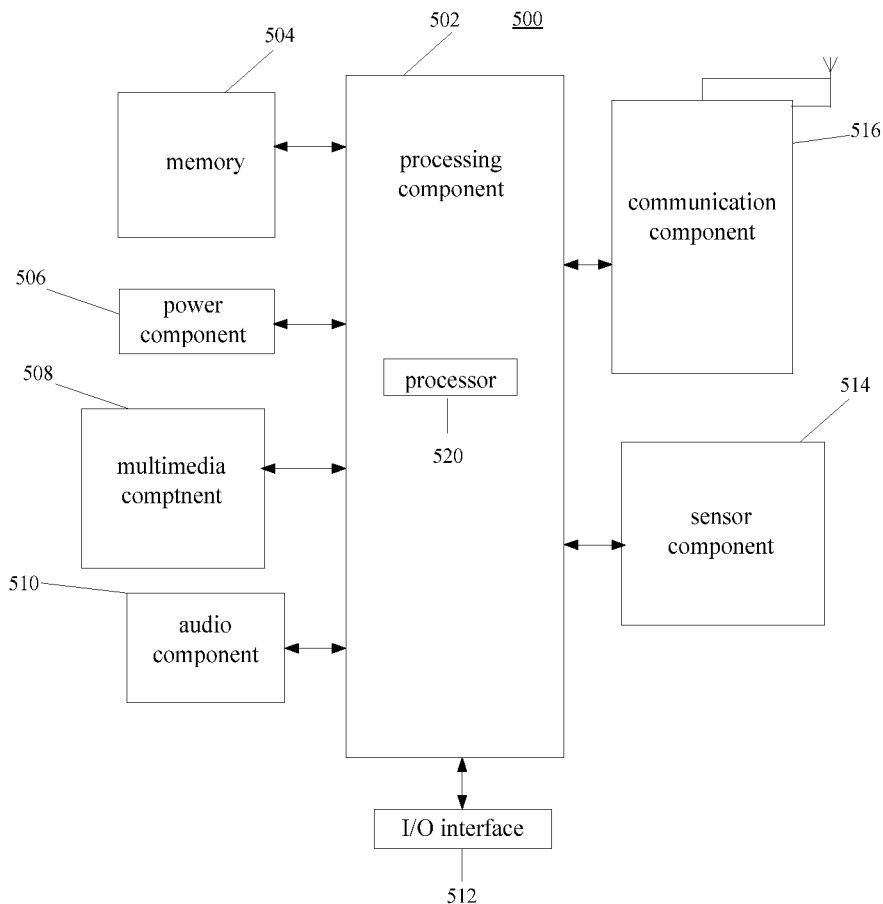
FIG. 5 is a block diagram illustrating an apparatus according to an example.

FIG. 5 is a block diagram illustrating an apparatus 500 for supporting multi-framework syntax according to an example. For example, the apparatus 500 may be a mobile phone, a computer, a digital broadcasting terminal, a messaging device, a game console, a tablet device, a medical device, fitness equipment, a Personal Digital Assistant PDA, and the like.

Referring to FIG. 5, the apparatus 500 may include the following one or more components: a processing component 502, a memory 504, a power component 506, a multimedia component 508, an audio component 510, an Input/Output (I/O) interface 512, a sensor component 514, and a communication component 516.

The processing component 502 typically controls overall operations of the apparatus 500, such as the operations associated with display, telephone calls, data communications, camera operations, and recording operations. The processing component 502 may include one or more processors 520 to execute instructions to perform all or part of the acts in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the apparatus 500. Examples of such data include instructions for any applications or methods operated on the apparatus 500, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the apparatus 500. The power component 506 may include a power management system, one or more power sources, and any other components associated with the generation, management, and distribution of power in the apparatus 500.

The multimedia component 508 includes a screen providing an output interface between the apparatus 500 and the user. In some examples, the screen may include a liquid crystal display (LCD) and a press panel (TP). If the screen includes the touchable panel, the screen may be implemented as a touch screen to receive input signals from the user. The touchable panel includes one or more touch sensors to sense touches, swipes, and other gestures on the touchable panel. The touch sensors may not only sense a boundary of a touch or swipe action, but also sense a duration time and a pressure associated with the touch or swipe action. In some examples, the multimedia component 508 includes a front camera and/or a rear camera. The front camera and/or the rear camera may receive external multimedia data while the apparatus 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone (MIC) configured to receive an external audio signal when the apparatus 500 is in an operation mode, such as a call mode, a recording mode, and a voice recognition mode. The received audio signal may be further stored in the memory 504 or transmitted via the communication component 516. In some examples, the audio component 510 further includes a speaker to output audio signals.

The I/O interface 512 provides an interface for the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the apparatus 500. For instance, the sensor component 514 may detect an open/closed status of the apparatus 500 and relative positioning of components (e.g. the display and the keypad of the apparatus 500). The sensor component 514 may also detect a change in position of the apparatus 500 or of a component in the apparatus 500, a presence or absence of user contact with the 500, an orientation or an acceleration/deceleration of the apparatus 500, and a change in temperature of the apparatus 500. The sensor component 514 may include a proximity sensor configured to detect the presence of nearby objects without any physical contact. The sensor component 514 may also include a light sensor, such as a CMOS or CCD image sensor, for use in imaging applications. In some examples, the sensor component 514 may also include an accelerometer sensor, a gyroscope sensor, a magnetic sensor, a pressure sensor, or a temperature sensor.

The communication component 516 is configured to facilitate wired or wireless communication between the apparatus 500 and other apparatuses. The apparatus 500 can access a wireless network based on a communication standard, such as WIFI, 2G, or 3G, or a combination thereof. In one example, the communication component 516 receives a broadcast signal or broadcast associated information from an external broadcast management system via a broadcast channel. In one example, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In examples, the apparatus 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above method In examples, there is also provided a non-transitory computer readable storage medium having instructions, such as the memory 504 including instructions. The instructions may be executed by the processors 520 of the apparatus 500 to perform the above method. For example, the non-transitory computer-readable storage medium may be a ROM, a RAM, a CD-ROM, a magnetic tape, a floppy disc, an optical data storage device, and the like.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

Other examples of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It is to be understood that, the present disclosure is not limited to the exact construction that has been described above and illustrated in the accompanying drawings, and that various modifications and changes can be made without departing form the scope thereof.

What is claimed is:

1. A method for supporting multi-framework syntax, comprising:
    generating, by a processor, a first abstract syntax tree corresponding to a Hyper Text Markup Language (HTML) template and at least one JavaScript Syntax eXtension (JSX) block, comprising: generating a second abstract syntax tree by parsing the HTML template; generating at least one third abstract syntax tree corresponding to the at least one JSX block, each node of the third abstract syntax tree corresponding to the JSX block comprising a variable, a function, or a statement; and obtaining the first abstract syntax tree by adding each node of the third abstract syntax tree to each designated node of the second abstract syntax tree;
    determining, by the processor, a mapping relationship between each node of the first abstract syntax, by the processor, tree and syntax of a designated framework; and
    mapping the first abstract syntax tree to an abstract syntax tree of the designated framework according to the mapping relationship.

2. The method according to claim 1, wherein the designated framework comprises a Vue framework, a React framework or a Weex framework.

3. A device for supporting multi-framework syntax, comprising:
    a processor; and
    a memory configured to store instructions executable by the processor;
    wherein the processor is configured to execute the instructions to perform:
    generating a first abstract syntax tree corresponding to a Hyper Text Markup Language (HTML) template and JavaScript Syntax eXtension (JSX) block, comprising: generating a second abstract syntax tree by parsing the HTML template; generating at least one third abstract syntax tree corresponding to the at least one JSX block, each node of the third abstract syntax tree corresponding to the JSX block comprising a variable, a function, or a statement; and obtaining the first abstract syntax tree by adding each node of the third abstract syntax tree to each designated node of the second abstract syntax tree;
    determining a mapping relationship between each node of the first abstract syntax tree and syntax of a designated framework; and
    mapping the first abstract syntax tree to an abstract syntax tree of the designated framework according to the mapping relationship.

4. The device according to claim 3, wherein the designated framework comprises a Vue framework, a React framework or a Weex framework.

5. A non-transitory computer-readable storage medium having stored therein instructions that, when executed by a processor, causes the processor to perform:
    generating a first abstract syntax tree corresponding to a Hyper Text Markup Language (HTML) template and at least one JavaScript Syntax eXtension (JSX) block, comprising: generating a second abstract syntax tree by parsing the HTML template; generating at least one third abstract syntax tree corresponding to the at least one JSX block, each node of the third abstract syntax tree corresponding to the JSX block comprising a variable, a function, or a statement; and obtaining the first abstract syntax tree by adding each node of the third abstract syntax tree to each designated node of the second abstract syntax tree;
    determining a mapping relationship between each node of the first abstract syntax tree and syntax of a designated framework; and
    mapping the first abstract syntax tree to an abstract syntax tree of the designated framework according to the mapping relationship.

6. The non-transitory computer-readable storage medium according to claim 5, wherein the designated framework comprises a Vue framework, a React framework or a Weex framework.

* * * * *